United States Patent
Cui et al.

(10) Patent No.: US 10,436,590 B2
(45) Date of Patent: Oct. 8, 2019

(54) LOCALIZATION SYSTEM AND METHOD, AND ROBOT USING THE SAME

(71) Applicant: ANKOBOT (SHANGHAI) SMART TECHNOLOGIES CO., LTD., Shanghai (CN)

(72) Inventors: Yuwei Cui, Shanghai (CN); Xiru Hou, Shanghai (CN); Kaiqi Cao, Shanghai (CN)

(73) Assignee: ANKOBOT (SHANGHAI) SMART TECHNOLOGIES CO., LTD., Shanghai (CN)

( * ) Notice: Subject to any disclaimer, the term of this patent is extended or adjusted under 35 U.S.C. 154(b) by 0 days.

(21) Appl. No.: 16/043,746

(22) Filed: Jul. 24, 2018

(65) Prior Publication Data

US 2019/0145775 A1    May 16, 2019

Related U.S. Application Data

(63) Continuation of application No. PCT/CN2017/112412, filed on Nov. 22, 2017.

(30) Foreign Application Priority Data

Nov. 10, 2017   (CN) .......................... 2017 1 1104306

(51) Int. Cl.
  *G01C 21/00*   (2006.01)
  *B25J 9/16*    (2006.01)
  (Continued)

(52) U.S. Cl.
  CPC .......... *G01C 21/005* (2013.01); *B25J 9/1692* (2013.01); *G05D 1/0253* (2013.01);
  (Continued)

(58) Field of Classification Search
  CPC ......... B25J 9/1692; G05B 2219/37555; G05B 2219/39016; G05B 2219/40543;
  (Continued)

(56) References Cited

U.S. PATENT DOCUMENTS

| 5,617,335 A * | 4/1997 | Hashima ................ B25J 9/1697 340/815.57 |
| 2006/0088203 A1* | 4/2006 | Boca ........................ G06K 9/32 382/153 |

(Continued)

FOREIGN PATENT DOCUMENTS

| CN | 103292804 | 9/2013 |
| CN | 104180818 | 12/2014 |

(Continued)

OTHER PUBLICATIONS

International Patent Application No. PCT/CN2017/112412 International Search Report and Written Opinion with English translation of opinion dated Aug. 1, 2018.

*Primary Examiner* — Jason Holloway
(74) *Attorney, Agent, or Firm* — Leber IP Law; David C. Robertson

(57) ABSTRACT

The present application provides a localization system and method, and robot using the same. The localization system comprises: a storage device, configured to store the corresponding relationship between an image coordinate system and a physical space coordinate system; an image acquisition device, configured to capture image frames during movement of the robot; and a processing device, connected with the image acquisition device and the storage device, and configured to acquire positions of visual features in an image frame at the current time and positions of the corresponding visual features in an image frame at the previous time and to determine the position and pose of the robot according to the corresponding relationship and the positions. In the present application, the localization error of the robot can be effectively reduced.

16 Claims, 3 Drawing Sheets

(51) Int. Cl.
*G06T 7/73* (2017.01)
*G05D 1/02* (2006.01)
*G06F 16/29* (2019.01)
*G06K 9/46* (2006.01)
*G06K 9/32* (2006.01)

(52) U.S. Cl.
CPC ............ G05D 1/0274 (2013.01); G06F 16/29 (2019.01); G06T 7/74 (2017.01); *G05B 2219/37555* (2013.01); *G05B 2219/39045* (2013.01); *G05B 2219/40543* (2013.01); *G05D 2201/0215* (2013.01); *G06K 9/4604* (2013.01); *G06K 2009/3225* (2013.01)

(58) Field of Classification Search
CPC . G05B 2219/39045; G06K 2009/3225; G06K 9/4604; G01C 21/005; G06T 7/74; G06F 17/30241; G06F 16/29; G05D 1/0274; G05D 1/0253; G05D 2201/0215
See application file for complete search history.

(56) References Cited

U.S. PATENT DOCUMENTS

| | | | | |
|---|---|---|---|---|
| 2009/0033655 | A1* | 2/2009 | Boca | B25J 9/1697 345/419 |
| 2010/0161125 | A1* | 6/2010 | Aoba | B25J 9/1692 700/254 |
| 2010/0274390 | A1* | 10/2010 | Walser | B25J 9/1697 700/259 |
| 2010/0286905 | A1* | 11/2010 | Goncalves | G01C 21/12 701/532 |
| 2011/0150319 | A1* | 6/2011 | Ramalingam | G01C 21/3602 382/153 |
| 2011/0164114 | A1* | 7/2011 | Kobayashi | G01B 11/25 348/46 |
| 2011/0235897 | A1* | 9/2011 | Watanabe | G06K 9/00214 382/154 |
| 2012/0148100 | A1* | 6/2012 | Kotake | G06T 7/0046 382/103 |
| 2012/0300020 | A1 | 11/2012 | Arth et al. | |
| 2013/0006423 | A1* | 1/2013 | Ito | B25J 9/1612 700/259 |
| 2013/0158947 | A1* | 6/2013 | Suzuki | G01B 11/00 702/155 |
| 2013/0238125 | A1* | 9/2013 | Suzuki | B25J 9/1612 700/253 |

FOREIGN PATENT DOCUMENTS

| | | |
|---|---|---|
| CN | 106338289 | 1/2017 |
| CN | 106352877 | 1/2017 |
| CN | 106444846 | 2/2017 |
| CN | 107193279 | 9/2017 |

* cited by examiner under the command of human operators or in pre-programmed programs, and can act according to principles set out by the artificial intelligence technology as well. This type of mobile robot can be used indoors or outdoors, and can be used in industry or household. For example, the mobile robot can be used to replace security guards to perform patrol, or replace people to clean the surface. The mobile robot can also be used to accompany family members or assist in doing office work. Because of the difference among fields to which different mobile robots applied, moving modes of the mobile robots in various fields are different. For example, the mobile robots can adopt wheel-type moving mode, walking-type moving mode or chain-type moving mode. With the development of motion control technology of mobile robots, simultaneous localization and mapping (SLAM) is performed based on the movement information provided by motion sensor like inertial measurement units (IMU) or odometers, to provide more accurate navigation capabilities for the mobile robots, so that the autonomous movement of mobile robots can be more effective. However, by taking a cleaning robot as an example, the travel distances of rolling wheel moving over a surface with different materials are not the same, so that a large difference can appear between a map created by the SLAM and a map of the actual physical space.

LOCALIZATION SYSTEM AND METHOD, AND ROBOT USING THE SAME

RELATED APPLICATION

This application is a continuation application of International Patent Application No. PCT/CN2017/112412, filed Nov. 22, 2017, which claims priority to Chinese Patent Application No. 201711104306.1, filed Nov. 10, 2017, the entire contents of which are hereby incorporated by reference.

TECHNICAL FIELD

The present application relates to the technical field of indoor localization, particularly to a localization system and method, and a robot using the same.

BACKGROUND

A mobile robot is a machine which can work automatically. The mobile robot can be operated

SUMMARY

In view of the above defects in the prior art, the objective of the present invention is to provide a localization system and method, and a robot using the same to solve problem in the prior art that a robot can not be accurately localized based on the data provided by a sensor.

In one aspect, the present application provides a localization system for a robot. The localization system comprises: a storage device, configured to store the corresponding relationship between an image coordinate system and a physical space coordinate system; an image acquisition device, configured to capture image frames during movement of the robot; and a processing device, connected with the image acquisition device and the storage device, and configured to acquire position of a matching feature in an image frame at the current time and position of the matching feature in an image frame at the previous time and to determine the position and pose of the robot according to the corresponding relationship and the positions.

In some embodiments, the angle between the optic axis of the field of view of the image acquisition device and the vertical line is ±30°, or the angle between the optic axis of the field of view of the image acquisition device and the horizontal line is 60-120°.

In some embodiments, the processing device comprises a tracking module which is connected with the image acquisition device and configured to track positions of corresponding features contained in two image frames, wherein, the corresponding features are a pair of matching features.

In some embodiments, the localization system further comprises a movement sensing device, connected with the processing device and configured to acquire movement information about the robot.

In some embodiments, the processing device comprises an initialization module which is configured to create the corresponding relationship based on the positions of the matching features in two image frames and the movement information acquired from the previous time to the current time.

In some embodiments, the processing device comprises: a first localization module, configured to determine the position and pose of the robot according to the corresponding relationship and the positions of the matching features; and a first localization compensation module, configured to compensate errors in the determined position and pose based on the acquired movement information.

In some embodiments, the storage device is configured to further store landmark information created based on the matching features.

In some embodiments, the processing device comprises: a second localization module, configured to determine the position and pose of the robot according to the corresponding relationship and the positions of the matching features; and a second localization compensation module, configured to compensate errors in the determined position and pose based on the stored landmark information corresponding to the matching features.

In some embodiments, the processing device comprises a map updating module which is configured to update the stored landmark information based on the matching features.

In another aspect, the present application provides a robot. The robot comprises: a storage device, configured to store the corresponding relationship between an image coordinate system and a physical space coordinate system; an image acquisition device, configured to capture image frames during movement of the robot; a processing device, connected with the image acquisition device and the storage device, and configured to acquire position of a matching feature in an image frame at the current time and position of the matching feature in an image frame at the previous time and to determine the position and pose of the robot according to the corresponding relationship and the positions; a movement device, configured to move the robot over a surface; and a control device, connected with the processing device and the movement device, and configured to control the movement device to move based on the position and pose provided by the processing device.

In some embodiments, the angle between the optic axis of the field of view of the image acquisition device and the vertical line is ±30°, or the angle between the optic axis of the field of view of the image acquisition device and the horizontal line is 60-120°.

In some embodiments, the processing device comprises a tracking module which is connected with the image acquisition device and configured to track positions of corresponding features contained in two image frames, wherein, the corresponding features are a pair of matching features.

In some embodiments, the robot further comprises a movement sensing device, connected with the control device and configured to acquire movement information about the robot.

In some embodiments, the processing device comprises an initialization module which is configured to create the corresponding relationship based on the positions of the matching features in two image frames and the movement information acquired from the previous time to the current time.

In some embodiments, the processing device comprises: a first localization module, configured to determine the position and pose of the robot according to the corresponding relationship and the positions of the matching features; and a first localization compensation module, configured to compensate errors in the determined position and pose based on the acquired movement information.

In some embodiments, the storage device is configured to further store landmark information created based on the matching features.

In some embodiments, the processing device comprises: a second localization module, configured to determine the position and pose of the robot according to the corresponding relationship and the positions of the matching features; and a second localization compensation module, configured to compensate errors in the determined position and pose based on the stored landmark information corresponding to the matching features.

In yet another aspect, the present application provides a localization method for a robot. The method comprises: acquiring position of a matching feature in an image frame at the current time and position of the matching feature in an image frame at the previous time; and determining the position and pose of the robot according to the corresponding relationship and the positions, wherein, the corresponding relationship comprises the corresponding relationship between an image coordinate system and a physical space coordinate system.

In some embodiments, the method further comprises a step of acquiring movement information about the robot.

In some embodiments, the method further comprises a step of creating the corresponding relationship based on the positions of the matching features in two image frames and the movement information acquired from the previous time to the current time.

As mentioned above, the localization system and method, and robot using the same of the present application have the following advantageous effect: the localization error of the robot can be effectively reduced by determining the position and pose of the robot by means of the position offset information about the matching feature points in two image frames captured by the image acquisition device. In addition, the corresponding relationship between an image coordinate system and a physical space coordinate system can be initialized based on the position offset information about the matching feature points in two image frames and the movement information provided by the sensor, thereby the localization performed by a monocular camera is implemented and the problem about accumulative errors of the sensor is solved effectively.

DETAILED DESCRIPTION

Implementations of the present application will be described below through specific embodiments, and those skilled in the art can easily understand other advantages and effects of the present application from the contents disclosed in the present specification.

Moreover, as used herein, such single forms as "one", "a" and "the" aim at also including the plural forms, unless contrarily indicted in the text. It should be further understood that, such terms as "comprise" and "include" indicate the existence of the features, steps, operations, elements, components, items, types and/or groups, but do not exclude the existence, emergence or addition of one or more other features, steps, operations, elements, components, items, types and/or groups. The terms "or" and "and/or" used herein are explained to be inclusive, or indicate any one or any combination. Therefore, "A, B or C" or "A, B and/or C" indicates "any of the following: A; B; C; A and B; A and C; B and C; A, B and C". Exceptions of the definition only exist when the combinations of elements, functions, steps or operations are mutually exclusive inherently in some ways.

On the basis of the continuous localization accumulation and in combination with other preset or acquired information related to movement, a mobile robot can create map data of the site where the robot is located, and can also provide route planning, route planning adjustment and navigation service based on the created map data, so that the efficiency of the mobile robot becomes higher. By taking a cleaning robot as an example, for example, an indoor cleaning robot can combine with the created indoor map and the localization technology to pre-determine the distance between the current position and an obstacle marked on the indoor map, so as to adjust the cleaning policy in time. Wherein, the obstacle can be described by a single marker, or can be marked as a wall, a table, a sofa or a wardrobe based on shape, dimension and other features. And for example, the indoor cleaning robot can accumulate all positions and poses determined based on the localization technology, and create the indoor map according to change in the accumulated positions and poses. By taking a patrol robot as an example, since the patrol robot is applied to a plant area, an industrial park and other scenarios in general, the patrol robot can combine with the created plant area map and the localization technology to pre-determine the distance between the current position and a corner, an intersection, a charging pile and other positions, so as to control the movement device of the robot to move in time according to other acquired monitoring data.

Figure 1:
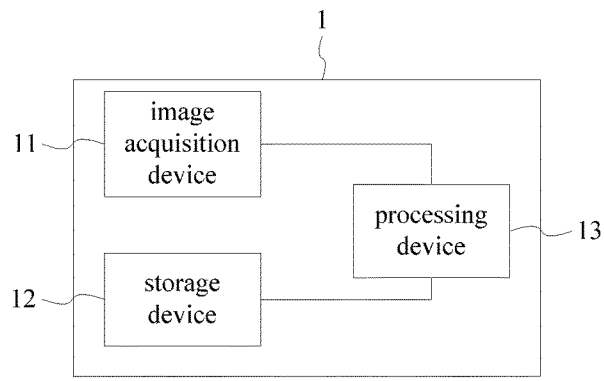
FIG. 1 shows a structural schematic diagram of a localization system of the present application in one embodiment.

For mobile robots used in other application scenarios which being analogized based on the example of the above-mentioned mobile robot, in order to increase the localization accuracy of mobile robots and reduce the accumulative errors of sensors, the present application provides a localization system for a robot. The localization system can be configured in a cleaning robot. Refer to FIG. 1 which shows a structural schematic diagram of the localization system. The localization system 1 includes a storage device 12, an image acquisition device 11 and a processing device 13.

Here, the storage device 12 includes but is not limited to a high speed random access memory and a non-volatile memory, for example, one or more disk storage devices, flash memory devices or other non-volatile solid state storage devices. In some embodiments, the storage device 12 can also include a storage away from one or more processors, for example, a network attached storage accessed via an RF circuit or an external port and a communication network (not shown). Wherein, the communication network can be an Internet, one or more intranets, a local area network (LAN), a wireless local area network (WLAN), a storage area network (SAN) or an appropriate combination thereof. A storage controller can control the access of other assemblies of robot such as a CPU and a peripheral interface to the storage device.

The image acquisition device 11 includes but is not limited to: a camera, a video camera, an image acquisition module integrated with an optical system or a CCD chip, and an image acquisition module integrated with an optical system and a CMOS chip. A power supply system of the image acquisition device can be controlled by a power supply system of the robot. During movement of the robot when being powered on, the image acquisition device 11 starts to capture image frames and provides the captured image frames to the processing device 13. For example, the captured indoor image frames are cached in the storage device in a preset video format by the image acquisition device of the cleaning robot and then are acquired by the processing device. The image acquisition device 11 is used to capture image frames during movement of the robot. Here, the image acquisition device 11 can be arranged at the top of the robot. For example, the image acquisition device of the cleaning robot can be arranged in the middle or at the edge of the top cover thereof. The angle between the optic axis of the field of view of the image acquisition device and the vertical line is ±30° or the angle between the optic axis of the field of view of the image acquisition device and the horizontal line is 60-120°. For example, the angle between the optic axis of the image acquisition device of the cleaning robot and the vertical line is −30°, −29°, −28°, −27° . . . −1°, 0°, 1°, 2° . . . 29° or 30°. And for example, the angle between the optic axis of the image acquisition device of the cleaning robot and the horizontal line is 60°, 61°, 62° . . . 119° or 120°. It should be noted that those skilled in the art should understand that the angle between the optic axis and the vertical line or the horizontal line is only an example but not to limit the accuracy of the angle thereof within the range of 1°. The accuracy of the angle can be higher according to the actual design requirements of the robot, for example, more than 0.1°, 0.01° or the like. Endless examples will not be recited herein.

The processing device 13 includes one or more processors. The processing device 13 is operably coupled to a volatile memory and/or a non-volatile memory in the storage device 12. The processing device 13 can execute an instruction stored in the memory and/or non-volatile storage device to execute an operation in the robot, for example, extracting features in the image frames and performing localization in a map based on the features. Thus, the processor can include one or more general-purpose microprocessors, one or more application specific integrated circuits (ASIC), one or more digital signal processors (DSP), one or more field programmable gate arrays (FPGA) or any combination thereof. The processing device is also operably coupled to an I/O port and an input structure, wherein, the robot can interact with various other electronic apparatus by the I/O port, and the user can interact with a computing apparatus by the input structure. Therefore, the input structure can include a button, a keyboard, a mouse, a touchpad and the like. The other electronic apparatus can be a mobile motor in the movement device of the robot, or a slave processor dedicated to the control of the movement device and the cleaning device in the robot, for example, a microcontroller unit (MCU).

In an example, the processing device 13 is connected with the storage device 12 and the image acquisition device 11 respectively through data cables. The processing device 13 interacts with the storage device 12 through a data read-write technology, and the processing device 13 interacts with the image acquisition device 11 through an interface protocol. Wherein, the data read-write technology includes but is not limited to: a high-speed/low-speed data interface protocol, a database read-write operation and the like. The interface protocol includes but is not limited to: an HDMI interface protocol, a serial interface protocol and the like.

The storage device 12 stores the corresponding relationship between an image coordinate system and a physical space coordinate system. Wherein, the image coordinate system is created based on image pixel points, and two-dimensional coordinate parameters of image pixel points in the image frames captured by the image acquisition device 11 can be described by the image coordinate system. The image coordinate system can be a rectangular coordinate system, a polar coordinate system or the like. For the physical space coordinate system, i.e., a coordinate system created based on each position in an actual two-dimensional or three-dimensional physical space, the physical space position thereof can be described in the physical space coordinate system according to the corresponding relationship between a preset image pixel unit and a unit length (or a unit angle). The physical space coordinate system can be a two-dimensional rectangular coordinate system, a polar coordinate system, a spherical coordinate system, a three-dimensional rectangular coordinate system or the like. For example, the physical space coordinate system can be camera coordinate system or world coordinate system.

For a robot used in a scenario where the surface (e.g., ground) complexity is not high, the corresponding relationship can be pre-stored in the storage device before delivery. However, for a robot used in a scenario where the surface complexity is high, for example, a cleaning robot, the corresponding relationship can be obtained by performing field test on the site used and then stored in the storage device. In some embodiments, the robot further includes a movement sensing device (not shown in the figure) used to acquire movement information about the robot. Wherein, the movement sensing device includes but is not limited to: a displacement sensor, a gyroscope, a speed sensor, a ranging sensor, an optical floor tracking sensor and a cliff sensor. During movement of the robot, the movement sensing device continuously senses movement information and provides the movement information for the processing device. The displacement sensor, the gyroscope, the optical floor tracking sensor and the speed sensor can be integrated in one or more chips. The ranging sensor and a cliff sensor can be arranged at the side of the robot. For example, the ranging sensor in the cleaning robot is arranged at the edge of a housing; and the cliff sensor in the cleaning robot is arranged at the bottom of the robot. According to the type and number of the sensors arranged in the robot, the movement information acquired by the processing device includes but is not limited to: displacement information, angle information, information about distance between robot and an obstacle, velocity information and advancing direction information.

To create the corresponding relationship, in some embodiments, the initialization module in the processing device creates the corresponding relationship based on the positions of the matching features in two image frames and the movement information acquired from the previous time to the current time. Here, the initialization module can be a program module, wherein, the program thereof is stored in the storage device, and is executed via the invoking of the processing device. If the corresponding relationship is not stored in the storage device, the initialization module is invoked by the processing device to create the corresponding relationship.

Here, during the movement of the robot, the initialization module acquires the movement information provided by the movement sensing device and each image frame provided by the image acquisition device. To reduce the accumulative errors of the movement sensing device, the initialization module can acquire the movement information and at least two image frames within a small period of time during which the robot moves. For example, the initialization module acquires the movement information and at least two image frames when monitoring that the robot moves in a straight line. And for example, the initialization module acquires the movement information and at least two image frames when monitoring that the robot moves angularly.

Then, the initialization module identifies and matches features in all image frames, and obtains image positions of the matching features in all image frames. Wherein, the features include but are not limited to corner features, edge features, line features and curve features. For example, the initialization module can acquire the image positions of the matching features using the tracking module in the processing device. The tracking module is used to track positions of corresponding features (corresponding visual features) contained in two image frames.

The initialization module creates the corresponding relationship according to the image positions and the physical space position provided via the movement information. Here, the initialization module can create the corresponding relationship by creating feature coordinate parameters of the physical space coordinate system and the image coordinate system. For example, the initialization module can create the corresponding relationship between the physical space coordinate system and image coordinate systems by taking the physical space position where the image frame captured at the previous time as the origin of the physical space coordinate system and corresponding the coordinate origin to the positions of the matching features of the image frames in the image coordinate system.

It should be noted that the working process of the initialization module can be executed based on the instruction of a user or is transparent to the user. For example, the execution process of the initialization module is started on the basis that the corresponding relationship is not stored in the storage device or the corresponding relationship is required to be updated. It will not be limited herein.

The corresponding relationship can be stored in the storage device in the manner such as programs corresponding algorithms, databases or the like. Thus, the software assembly stored in the storage includes an operating system, a communication module (or an instruction set), a contact/motion module (or an instruction set), a pattern module (or an instruction set), and an application (or an instruction set). In addition, the storage device further stores temporary data or persistent data including image frames captured by the image acquisition device, and the positions and poses obtained when the processing device performs localization computation.

After the corresponding relationship is created, the processing device acquires a matching feature in the image frame at the current time and the matching feature in the image frame at the previous time, and determines the position and pose of the robot according to the corresponding relationship and the features. Wherein, the matching feature in this application is an image feature which is in different image frames and conforms to preset matching degree. That is, the manner of acquiring a matching feature in the image frame at the current time and the matching feature in the image frame at the previous time is the manner of acquiring a visual feature in an image frame at the current time and the corresponding visual feature in an image frame at the previous time, wherein, the visual feature and the corresponding visual feature are called matching feature both.

Here, the processing device 13 can acquire an image frame at the previous time t1 and an image frame at current time t2 according to a preset time interval or image frame number interval, and identify and match the features in two image frames. Wherein, according to the design of processing capabilities of hardware and software used in the localization system, the time interval can be between several milliseconds and several hundred milliseconds, and the image frame number interval can be between 0 frame and dozens of frames. The features include but are not limited to shape features and grayscale features. The shape features include but are not limited to corner features, line features, edge features and curve features. The grayscale features include but are not limited to grayscale jump features, grayscale values greater than or less than a grayscale threshold, region dimensions of a preset grayscale range contained in the image frames.

In order to obtain accurate localization, there are multiple matching features in general, for example, more than 10 matching features. Thus, the processing device 13 seeks matching features from the identified features based on the positions of the identified features in respective image frames. For example, refer to FIG. 2 which shows a schematic diagram of a change in relationship between the positions of the matching features in two image frames acquired at time t1 and time t2. After the features in image frames are identified, the processing device 13 determines that an image frame P1 contains features a1 and a2, an image frame P2 contains features b1, b2 and b3. Meanwhile, the feature a1 and the features b1 and b2 all belong to the same feature, and the feature a2 and the feature b3 belong to the same feature. The processing device 13 determines that the feature a1 in the image frame P1 is located on the left of the feature a2 and the spacing therebetween is d1 pixel point. The processing device 13 determines that the feature b1 in the image frame P2 is located on the left of the feature b3 and the spacing therebetween is d1' pixel point, and the feature b2 is located on the right of the feature b3 and the spacing therebetween is d2' pixel point. And then the processing device 13 matches the position relationship between the feature b1 and the feature b3, and the position relationship between the feature b2 and the feature b3 with the position relationship between the feature a1 and the feature a2 respectively, and matches the pixel spacing between the feature b1 and the feature b3, and the pixel spacing between the feature b2 and the feature b3 with the pixel spacing between the feature a1 and the feature a2 respectively. Based on the matching results, the processing device 13 determines that the feature a1 in the image frame P1 matches with the feature b1 in the image frame P2, and the feature a2 matches with the feature b3. By that analogy, the processing device 13 can match all features and localize the position and pose of the robot based on the change in image pixels position corresponding to the feature. Wherein, the position of the robot can be obtained according to the displacement change in a two-dimensional plane, and the pose can be obtained according to the angle change in the two-dimensional plane.

Here, the processing device 13 can determine the image position offset information about a plurality of features in two image frames or determine the physical position offset information about the plurality of features in the physical space according to the corresponding relationship, and compute the relative position and pose of the robot from the time t1 to the time t2 by synthesizing any one of the obtained position offset information. For example, through coordinate transformation, the processing device 13 determines that the position and pose of the robot from the time t1 at which the image frame P1 is obtained to the time t2 at which the image frame P2 is obtained is: moving m length over a surface and rotating n degree to the left. By taking a cleaning robot as an example, when the cleaning robot already creates a map, it can help the robot determine whether it is on a planned route according to the position and pose obtained by the processing device 13. When the cleaning robot does not create a map, it can help the robot determine the relative displacement and the relative rotating angle according to the position and pose obtained by the processing device 13, and draw the map by means of the data.

In some embodiments, the processing device 13 includes: a tracking module and a localization module. Wherein, the tracking module and the localization module can share the processor and other hardware circuit in the processing device 13, and implement data interaction and instruction invoking based on a program interface.

Wherein, the tracking module is connected with the image acquisition device 11 and is used to track positions of corresponding features contained in two image frames.

In some embodiments, with respect to the features in the image frame at the previous time, the tracking module can, in the image frame at the current time, track the above features using the visual tracking technology to obtain matching features. For example, by taking the position of the feature $c_i$ identified in the image frame P1 at the previous time in the image frame P1 as a reference, the tracking module determines whether the region nearby the corresponding position in the image frame P2 at the current time contains the corresponding feature $c_i$, and acquires the position of the feature $c_i$ in the image frame P2 if the corresponding feature $c_i$ is found, or determines that the feature $c_i$ is not in the image frame P2 if the corresponding feature $c_i$ is not found. Thus, when a plurality of tracked features and the positions of all features in respective image frames are collected, all the features and respective positions are provided for the localization module.

In yet some embodiments, the tracking module can track the positions of the corresponding features contained in two image frames based on the movement information provided by the movement sensing device in the robot. For example, the hardware circuit of the tracking module is connected with the movement sensing device through data cables, and acquires movement information corresponding to the time t1 and t2 at which the two image frames P1 and P2 are acquired, estimates the candidate position of the corresponding feature $c_i$ in the image frame P2 at the current time through the position change described by the movement information by using the corresponding relationship and each feature $c_i$ identified in the image frame P1 at the previous time and the position thereof in the image frame P1, identifies the corresponding feature $c_i$ in the vicinity of the estimated candidate position, and acquires the position of the feature $c_i$ in the image frame P2 if the corresponding feature $c_i$ is found, or determines that the feature $c_i$ is not in the image frame P2 if the corresponding feature $c_i$ is not found. Thus, when the tracked features (i.e. matching features) and respective positions thereof are collected, all the features and the positions thereof are provided for the localization module.

Based on the corresponding relationship and the positions, the localization module is used to determine the position offset information about the robot from the previous time to the current time and obtain the position and pose of the robot.

Here, the localization module can be formed by combining a plurality of program modules, and can be formed by a single program module. For example, in order to obtain the change in the relative position and pose of the robot quickly, the position offset information from the previous time to the current time can be obtained by performing coordinate transformation on the positions of the same feature in two image frames only by the localization module based on the corresponding relationship. The position offset information reflects the change in the relative position and pose of the robot from the previous time to the current time. The localization method can be used in localization with adequate matching features. For example, during navigation of the robot, whether the current moving route of the robot is offset can be quickly determined by acquiring change in the relative position and pose using the above-mentioned method, and subsequent navigation adjustment can be performed based on the determination result.

To prevent accumulation of errors in the image acquisition device 11, in one embodiment, the processing device 13 determines the position and pose of the robot by combining with the movement information provided by the movement sensing device. The processing device 13 includes: a first localization module and a first localization compensation module, wherein, the first localization module and the first localization compensation module can be the program module in the above-mentioned localization module. The first localization module is used to determine the position and pose of the robot according to the corresponding relationship and the positions of the matching features. The first localization compensation module is used to compensate errors in the determined position and pose based on the acquired movement information.

For example, the first localization module acquires two image frames from time t1 to time t2 and also acquires movement information. The first localization module obtains a plurality of features for localization in two image frames and positions thereof in respective image frames according to the above-mentioned feature identifying and matching method, and determines the first position and pose of the robot based on the corresponding relationship. Based on the acquired displacement information and angle information, the first localization compensation module determines that the robot moves a distance provided by the displacement information along the deflection direction and the deflection angle indicated by the angle information, so that the second position and pose of the robot are obtained.

Affected by errors of two computing methods and hardware apparatus, there must be errors between the obtained first position and pose and second position and pose. To reduce the errors, the first localization compensation module determines the position and pose of the robot based on the errors between the first position and pose and the second position and pose. Here, the first localization compensation module can perform weight-based mean processing based on the displacement information and angle information corresponding to the first position and pose and the second position and pose respectively, thereby obtaining a position and pose of which errors are compensated. For example, the first localization compensation module takes the displacement information in the first candidate position and pose and the displacement information in the second candidate position and pose to perform weighted mean processing, thereby obtaining the displacement information in the compensated position and pose. The first localization compensation module takes the angle change information in the first candidate position and pose and the angle change information in the second candidate position and pose to perform weighted mean processing, thereby obtaining the angle change information in the compensated position and pose.

In another embodiment, the processing device 13 can compensate the errors in the position and pose determined only based on the positions of the matching features in the image frames at the previous time and the current time by combining with the landmark information created based on the matching features. Correspondingly, the landmark information is stored in the storage device 12. The landmark information includes but is not limited to the following attribute information: features matched each time, map data of the features obtained each time in the physical space, the positions of the features obtained each time in corresponding image frames, positions and poses when obtaining corresponding feature and the like. The landmark information and the map data can be stored in the storage device 12 together.

The processing device 13 includes: a second localization module and a second localization compensation module. The second localization module is used to determine the position and pose of the robot according to the corresponding relationship and the positions of the matching features. The second localization compensation module is used to compensate errors in the determined position and pose based on the stored landmark information corresponding to the matching features. Wherein, the second localization module and the second localization compensation module can be the program module of the above-mentioned localization module.

For example, the second localization module obtains a plurality of features for localization in two image frames acquired at the previous time and the current time and positions thereof in respective image frames according to the above-mentioned feature identifying and matching method, and determines the first position and pose of the robot from the previous time t1 to the current time t2 based on the corresponding relationship. The second localization compensation module individually matches the matching features in two image frames with the features in the pre-stored landmark information respectively, and determines the position and pose of the robot at each obtaining time using other attribute information in the landmark information corresponding to respective matching features, thus obtaining the second position and pose of the robot from the previous time t1 to the current time t2. Then, the second localization compensation module determines the position and pose of the robot based on the errors between the first position and pose and the second position and pose. For example, the second localization compensation module takes the displacement information in the first position and pose and the displacement information in the second position and pose to perform weighted mean processing, thereby obtaining the displacement information in the compensated position and pose. The second localization compensation module takes the angle change information in the first position and pose and the angle change information in the second position and pose to perform weighted mean processing, thereby obtaining the angle change information in the compensated position and pose.

It should be noted that the processing device 13 can perform error compensation by combining with the error compensation method containing the above-mentioned one or more error compensation modes. Alternatively, based on the above-mentioned one or more error compensation modes, the improvement and development for the error compensation mode performed by the processing device 13 should be regarded as examples generated based on the localization technology of the present application.

In addition, the features recorded as landmark information are constant in general.

However, in practical application, the features recorded as landmark information are not the case. For example, the features recorded as landmark information are contour features of a lamp, and corresponding features disappear after the lamp is replaced. If there is a need for the robot to perform localization by means of the features, features used to compensate errors will not be found. Therefore, the processing device 13 further includes an updating module which is used to update the stored landmark information based on the matching features.

Here, the updating module can acquire information including: matching features, positions of the matching features in at least one image frame, the position and pose determined by the localization module, the first localization compensation module or the second localization compensation module.

The updating module can determine whether to update the stored landmark information by comparing each landmark information stored in the storage device 12 with the acquired information. For example, if the updating module finds that a feature is not stored in the storage device 12 based on similar or identical positions and poses, the feature is correspondingly saved in the corresponding landmark information complementally. And for example, if the updating module finds that a feature is stored in the storage device 12 but cannot match with the new matching feature based on similar or identical positions and poses, the redundant feature saved in the corresponding landmark information is deleted.

The updating module can add new landmark information on the basis that the number of the current matching features is greater than the preset threshold, wherein, the threshold can be fixed or set based on the number of corresponding features at the position marked in the map. For example, if the updating module finds that the number of new matching features is greater than the number of features stored in the storage device at corresponding positions based on similar or identical positions and poses, the new features are added to the created landmark information.

It should be noted that those skilled in the art should understand that the above-mentioned manner of adjusting the feature in the landmark information based on positions is only an example but not to limit the present application. In fact, the updating module can also adjust positions in the map based on features.

Figure 3:
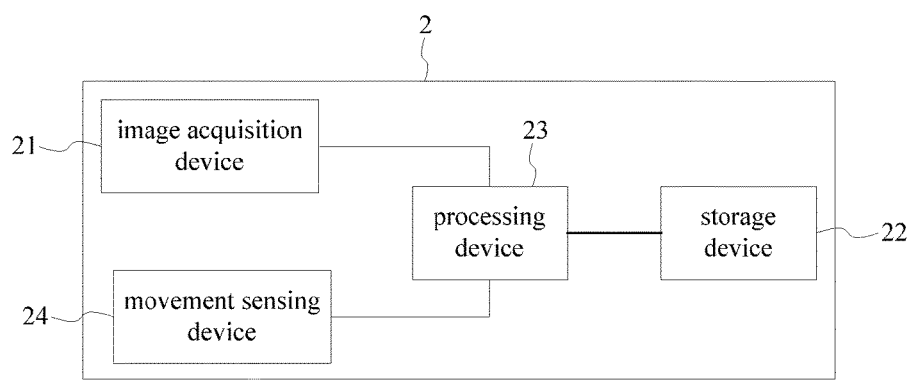
FIG. 3 shows a structural schematic diagram of a localization system of the present application in another embodiment.

Refer to FIG. 3 which shows a structural schematic diagram of another localization system of the present application. The localization system can be configured in a cleaning robot, wherein, the localization system 2 includes a movement sensing device 24, an image acquisition device 21, a processing device 23 and a storage device 22.

Here, the movement sensing device 24 includes but is not limited to: a displacement sensor, a gyroscope, a speed sensor, a ranging sensor and a cliff sensor. During movement of the robot, the movement sensing device 24 continuously senses movement information and provides them for the processing device. The displacement sensor, the gyroscope and the speed sensor can be integrated in one or more chips. The ranging sensor and a cliff sensor can be arranged at the side of the robot. For example, the ranging sensor in the cleaning robot is arranged at the edge of a housing; and the cliff sensor in the cleaning robot is arranged at the bottom of the robot. According to the type and number of the sensors arranged in the robot, the movement information acquired by the processing device includes but is not limited to: displacement information, angle information, information about distance between robot and an obstacle, velocity information and advancing direction information.

The storage device 22 includes but is not limited to a high speed random access memory and a non-volatile memory, for example, one or more disk storage devices, flash memory devices or other non-volatile solid state storage devices. In some embodiments, the storage device 22 can also include a storage away from one or more processors, for example, a network attached storage accessed via an RF circuit or an external port and a communication network (not shown). Wherein, the communication network can be an Internet, one or more intranets, a local area network (LAN), a wireless local area network (WLAN), a storage area network (SAN) or an appropriate combination thereof. A storage controller can control the access of other assemblies of robot such as a CPU and a peripheral interface to the storage device.

The image acquisition device 21 includes but is not limited to: a camera, a video camera, an image acquisition module integrated with an optical system or a CCD chip, and an image acquisition module integrated with an optical system and a CMOS chip. A power supply system of the image acquisition device can be controlled by a power supply system of the robot. During movement of the robot when being powered on, the image acquisition device 21 starts to capture image frames and provides the captured image frames to the processing device. For example, the captured indoor image frames are cached in the storage device in a preset video format by the image acquisition device of the cleaning robot and then are acquired by the processing device.

The image acquisition device 21 is used to capture image frames during movement of the robot. Here, the image acquisition device 21 can be arranged at the top of the robot. For example, the image acquisition device of the cleaning robot can be arranged in the middle or at the edge of the top cover thereof. The angle between the optic axis of the field of view of the image acquisition device and the vertical line is ±30° or the angle between the optic axis of the field of view of the image acquisition device and the horizontal line is 60-120°. For example, the angle between the optic axis of the image acquisition device of the cleaning robot and the vertical line is −30°, −29°, −28°, −27° . . . −1°, 0°, 1°, 2° . . . 29° or 30°. And for example, the angle between the optic axis of the image acquisition device of the cleaning robot and the horizontal line is 60°, 61°, 62° . . . 119° or 120°. It should be noted that those skilled in the art should understand that the angle between the optic axis and the vertical line or the horizontal line is only an example but not to limit the accuracy of the angle thereof within the range of 1°. The accuracy of the angle can be higher according to the actual design requirements of the robot, for example, more than 0.1°, 0.01° or the like. Endless examples will not be recited herein.

To increase the localization accuracy of the mobile robot and reduce errors accumulation of the sensor, during movement of the robot, the processing device 23 acquires an image frame at the previous time and an image frame at the current time from the image acquisition device 21, and creates the corresponding relationship between an image coordinate system and a physical space coordinate system based on positions of matching features in two image frames and the movement information acquired by the movement sensing device from the previous time to the current time, and stores the corresponding relationship in the storage device.

Here, the processing device 23 includes one or more processors. The processing device 23 is operably coupled to a volatile memory and/or a non-volatile memory in the storage device 22. The processing device 23 can execute an instruction stored in the memory and/or non-volatile storage device to execute an operation in the robot, for example, extracting features in the image frames and performing localization in a map based on the features. Thus, the processor can include one or more general-purpose microprocessors, one or more application specific integrated circuits (ASIC), one or more digital signal processors (DSP), one or more field programmable gate arrays (FPGA) or any combination thereof. The processing device is also operably coupled to an I/O port and an input structure, wherein, the robot can interact with various other electronic apparatus by the I/O port, and the user can interact with a computing apparatus by the input structure. Therefore, the input structure can include a button, a keyboard, a mouse, a touchpad and the like. The other electronic apparatus can be a mobile motor in the movement device of the robot, or a slave processor dedicated to the control of the movement device and the cleaning device in the robot, for example, a microcontroller unit (MCU).

In an example, the processing device 23 is connected with the storage device 22, the image acquisition device 21 and movement sensing device 24 respectively through data cables. The processing device 23 interacts with the storage device through a data read-write technology, and the processing device 23 interacts with the image acquisition device 21 and movement sensing device 24 respectively through an interface protocol. Wherein, the data read-write technology includes but is not limited to: a high-speed/low-speed data interface protocol, a database read-write operation and the like. The interface protocol includes but is not limited to: an HDMI interface protocol, a serial interface protocol and the like.

To create the corresponding relationship, in some embodiments, the initialization module in the processing device 23 creates the corresponding relationship based on the positions of the matching features in two image frames and the movement information acquired from the previous time to the current time. Here, the initialization module can be a program module, wherein, the program thereof is stored in the storage device, and is executed via the invoking of the processing device. If the corresponding relationship is not stored in the storage device, the initialization module is invoked by the processing device to create the corresponding relationship.

Here, during the movement of the robot, the initialization module acquires the movement information provided by the movement sensing device and each image frame provided by the image acquisition device. To reduce the accumulative errors of the movement sensing device, the initialization module can acquire the movement information and at least two image frames within a small period of time during which the robot moves. Here, the processing device can acquire an image frame at the previous time t1 and an image frame at current time t2 according to a preset time interval or image frame number interval. Wherein, according to the design of processing capabilities of hardware and software used in the localization system, the time interval can be between several milliseconds and several hundred milliseconds, and the image frame number interval can be between 0 frame and dozens of frames. For example, the initialization module acquires the movement information and at least two image frames when monitoring that the robot moves in a straight line. And for example, the initialization module acquires the movement information and at least two image frames when monitoring that the robot moves angularly.

Then, the initialization module identifies and matches features in all image frames, and obtains image positions of the matching features in all image frames. Wherein, the features include but are not limited to corner features, edge features, line features and curve features. For example, the initialization module can acquire the image positions of the matching features using the tracking module in the processing device. The tracking module is used to track positions of corresponding features contained in two image frames.

The initialization module creates the corresponding relationship according to the image positions and the physical space position provided via the movement information. Here, the initialization module can create the corresponding relationship by creating feature coordinate parameters of the physical space coordinate system and the image coordinate system. For example, the initialization module can create the corresponding relationship between the physical space coordinate system and image coordinate systems by taking the physical space position where the image frame obtained at the previous time as the origin of the physical space coordinate system and corresponding the coordinate origin to the positions of the matching features of the image frames in the image coordinate system.

It should be noted that the working process of the initialization module can be executed based on the instruction of a user or is transparent to the user. For example, the execution process of the initialization module is started on the basis that the corresponding relationship is not stored in the storage device 22 or the corresponding relationship is required to be updated. It will not be limited herein.

The corresponding relationship can be stored in the storage device 22 in the manner such as programs corresponding algorithms, databases or the like. Thus, the software assembly stored in the storage includes an operating system, a communication module (or an instruction set), a contact/motion module (or an instruction set), a pattern module (or an instruction set), and an application (or an instruction set). In addition, the storage device 22 further stores temporary data or persistent data including image frames captured by the image acquisition device 21, and the positions and poses obtained when the processing device 23 performs localization computation.

After the corresponding relationship is created, the processing device 23 can determine the position and pose of the robot according to the corresponding relationship. Here, the processing device 23 acquires the image frames captured by the image acquisition device 21, identifies the features from the image frames, determines the positions of the features in the image frames in the physical space based on the corresponding relationship, and determines the position and pose of the robot by means of accumulation of multiple image frames.

In one embodiment, the processing device 23 acquires the matching features in the image frame at the current time and the matching features in the image frame at the previous time, and determines the position and pose of the robot according to the corresponding relationship and the features.

Here, the processing device 23 can acquire an image frame at the previous time t1 and an image frame at current time t2 according to a preset time interval or image frame number interval, and identify and match the features in two image frames. Wherein, according to the design of processing capabilities of hardware and software used in the localization system, the time interval can be between several milliseconds and several hundred milliseconds, and the image frame number interval can be between 0 frame and dozens of frames. The features include but are not limited to shape features and grayscale features. The shape features include but are not limited to corner features, line features, edge features and curve features. The grayscale features include but are not limited to grayscale jump features, grayscale values greater than or less than a grayscale threshold, region dimensions of a preset grayscale range contained in the image frames.

Figure 2:
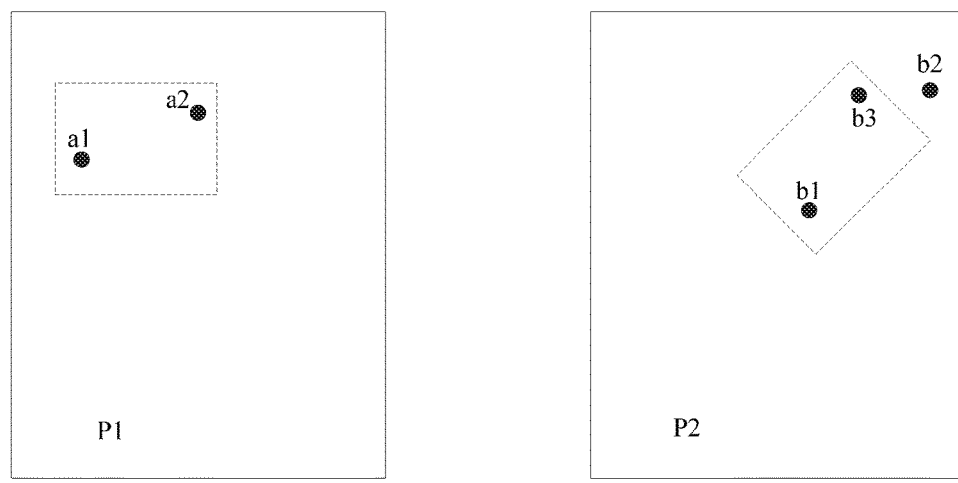
FIG. 2 shows a schematic diagram of matching features in two image frames of a localization system of the present application.

In order to obtain accurate localization, there are multiple matching features in general, for example, more than 10 matching features. Thus, the processing device 23 seeks matching features from the identified features based on the positions of the identified features in respective image frames. For example, as shown in FIG. 2, after identifying the features in all image frames, the processing device 23 determines that an image frame P1 contains features a1 and a2, an image frame P2 contains features b1, b2 and b3. Meanwhile, the feature a1 and the features b1 and b2 all belong to the same feature, and the feature a2 and the feature b3 belong to the same feature. The processing device 23 determines that the feature a1 in the image frame P1 is located on the left of the feature a2 and the spacing therebetween is d1 pixel point. The processing device 23 determines that the feature b1 in the image frame P2 is located on the left of the feature b3 and the spacing therebetween is d1' pixel point, and the feature b2 is located on the right of the feature b3 and the spacing therebetween is d2' pixel point. And then the processing device 23 matches the position relationship between the feature b1 and the feature b3, and the position relationship between the feature b2 and the feature b3 with the position relationship between the feature a1 and the feature a2 respectively, and matches the pixel spacing between the feature b1 and the feature b3, and the pixel spacing between the feature b2 and the feature b3 with the pixel spacing between the feature a1 and the feature a2 respectively. Based on the matching results, the processing device 23 determines that the feature a1 in the image frame P1 matches with the feature b1 in the image frame P2, and the feature a2 matches with the feature b3. By that analogy, the processing device 23 can match all features and localize the position and pose of the robot based on the change in image pixels position corresponding to the feature. Wherein, the position of the robot can be obtained according to the displacement change in a two-dimensional plane, and the pose can be obtained according to the angle change in the two-dimensional plane.

Here, the processing device 23 can determine the image position offset information about a plurality of features in two image frames or determine the physical position offset information about the plurality of features in the physical space according to the corresponding relationship, and compute the relative position and pose of the robot from the time t1 to the time t2 by synthesizing any one of the obtained position offset information. For example, through coordinate transformation, the processing device 23 determines that the position and pose of the robot from the time t1 at which the image frame P1 is obtained to the time t2 at which the image frame P2 is obtained is: moving m length over a surface and rotating n degree to the left. By taking a cleaning robot as an example, when the cleaning robot already creates a map, it can help the robot determine whether it is on a planned route according to the position and pose obtained by the processing device 23. When the cleaning robot does not create a map, it can help the robot determine the relative displacement and the relative rotating angle according to the position and pose obtained by the processing device 23, and draw the map by means of the data.

In some embodiments, the processing device 23 includes: a tracking module and a localization module. Wherein, the tracking module and the localization module can share the processor and other hardware circuit in the processing device 23, and implement data interaction and instruction invoking based on a program interface.

Wherein, the tracking module is connected with the image acquisition device 21 and is used to track positions of corresponding features contained in two image frames.

In some embodiments, with respect to the features in the image frame at the previous time, the tracking module can, in the image frame at the current time, track the above features using the visual tracking technology to obtain matching features. For example, by taking the position of the feature ci identified in the image frame P1 at the previous time in the image frame P1 as a reference, the tracking module determines whether the region nearby the corresponding position in the image frame P2 at the current time contains the corresponding feature ci, and acquires the position of the feature ci in the image frame P2 if the corresponding feature ci is found, or determines that the feature ci is not in the image frame P2 if the corresponding feature ci is not found. Thus, when a plurality of tracked features and the positions of all features in respective image frames are collected, all the features and respective positions are provided for the localization module.

In yet some embodiments, the tracking module can track the positions of the corresponding features contained in two image frames based on the movement information provided by the movement sensing device 24 in the robot. For example, the hardware circuit of the tracking module is connected with the movement sensing device 24 through data cables, and acquires movement information corresponding to the time t1 and t2 at which the two image frames P1 and P2 are acquired, estimates the candidate position of the corresponding feature ci in the image frame P2 at the current time through the position change described by the movement information by using the corresponding relationship and each feature ci identified in the image frame P1 at the previous time and the position thereof in the image frame P1, identifies the corresponding feature ci in the vicinity of the estimated candidate position, and acquires the position of the feature ci in the image frame P2 if the corresponding feature ci is found, or determines that the feature ci is not in the image frame P2 if the corresponding feature ci is not found. Thus, when the tracked features (i.e. matching features) and respective positions thereof are collected, all the features and the positions thereof are provided for the localization module.

Based on the corresponding relationship and the positions, the localization module is used to determine the position offset information about the robot from the previous time to the current time and obtain the position and pose of the robot.

Here, the localization module can be formed by combining a plurality of program modules, and can be formed by a single program module. For example, in order to obtain the change in the relative position and pose of the robot quickly, the position offset information from the previous time to the current time can be obtained by performing coordinate transformation on the positions of the same feature in two image frames only by the localization module based on the corresponding relationship. The position offset information reflects the change in the relative position and pose of the robot from the previous time to the current time. The localization method can be used in localization with adequate matching features. For example, during navigation of the robot, whether the current moving route of the robot is offset can be quickly determined by acquiring change in the relative position and pose using the above-mentioned method, and subsequent navigation adjustment can be performed based on the determination result.

To prevent accumulation of errors in the image acquisition device 21, in one embodiment, the processing device 23 determines the position and pose of the robot by combining with the movement information provided by the movement sensing device 24. The processing device 23 includes: a first localization module and a first localization compensation module, wherein, the first localization module and the first localization compensation module can be the program module in the above-mentioned localization module. The first localization module is used to determine the position and pose of the robot according to the corresponding relationship and the positions of the matching features. The first localization compensation module is used to compensate errors in the determined position and pose based on the acquired movement information.

For example, the first localization module acquires two image frames from time t1 to time t2 and also acquires movement information. The first localization module obtains a plurality of features for localization in two image frames and positions thereof in respective image frames according to the above-mentioned feature identifying and matching method, and determines the first position and pose of the robot based on the corresponding relationship. Based on the acquired displacement information and angle information, the first localization compensation module determines that the robot moves a distance provided by the displacement information along the deflection direction and the deflection angle indicated by the angle information, so that the second position and pose of the robot are obtained.

Affected by errors of two computing methods and hardware apparatus, there must be errors between the obtained first position and pose and second position and pose. To reduce the errors, the first localization compensation module determines the position and pose of the robot based on the errors between the first position and pose and the second position and pose. Here, the first localization compensation module can perform weight-based mean processing based on the displacement information and angle information corresponding to the first position and pose and the second position and pose respectively, thereby obtaining a position and pose of which errors are compensated. For example, the first localization compensation module takes the displacement information in the first candidate position and pose and the displacement information in the second candidate position and pose to perform weighted mean processing, thereby obtaining the displacement information in the compensated position and pose. The first localization compensation module takes the angle change information in the first candidate position and pose and the angle change information in the second candidate position and pose to perform weighted mean processing, thereby obtaining the angle change information in the compensated position and pose.

In another embodiment, the processing device 23 can compensate the errors in the position and pose determined only based on the positions of the matching features in the image frames at the previous time and the current time by combining with the landmark information created based on the matching features. Correspondingly, the landmark information is stored in the storage device 22. The landmark information includes but is not limited to the following attribute information: features matched each time, map data of the features obtained each time in the physical space, the positions of the features obtained each time in corresponding image frames, positions and poses when obtaining corresponding feature and the like. The landmark information and the map data can be stored in the storage device 22 together.

The processing device 23 includes: a second localization module and a second localization compensation module. The second localization module is used to determine the position and pose of the robot according to the corresponding relationship and the positions of the matching features. The second localization compensation module is used to compensate errors in the determined position and pose based on the stored landmark information corresponding to the matching features. Wherein, the second localization module and the second localization compensation module can be the program module of the above-mentioned localization module.

For example, the second localization module obtains a plurality of features for localization in two image frames acquired at the previous time and the current time and positions thereof in respective image frames according to the above-mentioned feature identifying and matching method, and determines the first position and pose of the robot from the previous time t1 to the current time t2 based on the corresponding relationship. The second localization compensation module individually matches the matching features in two image frames with the features in the pre-stored landmark information respectively, and determines the position and pose of the robot at each obtaining time using other attribute information in the landmark information corresponding to respective matching features, thus obtaining the second position and pose of the robot from the previous time t1 to the current time t2. Then, the second localization compensation module determines the position and pose of the robot based on the errors between the first position and pose and the second position and pose. For example, the second localization compensation module takes the displacement information in the first position and pose and the displacement information in the second position and pose to perform weighted mean processing, thereby obtaining the displacement information in the compensated position and pose. The second localization compensation module takes the angle change information in the first position and pose and the angle change information in the second position and pose to perform weighted mean processing, thereby obtaining the angle change information in the compensated position and pose.

It should be noted that the processing device 23 can perform error compensation by combining with the error compensation method containing the above-mentioned one or more error compensation modes. Alternatively, based on the above-mentioned one or more error compensation modes, the improvement and development for the error compensation mode performed by the processing device 23 should be regarded as examples generated based on the localization technology of the present application.

In addition, the features recorded as landmark information are constant in general.

However, in practical application, the features recorded as landmark information are not the case. For example, the features recorded as landmark information are contour features of a lamp, and corresponding features disappear after the lamp is replaced. If there is a need for the robot to perform localization by means of the features, features used to compensate errors will not be found. Therefore, the processing device 23 further includes an updating module which is used to update the stored landmark information based on the matching features.

Here, the updating module can acquire information including: matching features, positions of the matching features in at least one image frame, the position and pose determined by the localization module, the first localization compensation module or the second localization compensation module.

The updating module can determine whether to update the stored landmark information by comparing each landmark information stored in the storage device 22 with the acquired information. For example, if the updating module finds that a feature is not stored in the storage device 22 based on similar or identical positions and poses, the feature is correspondingly saved in the corresponding landmark information complementally. And for example, if the updating module finds that a feature is stored in the storage device 22 but cannot match with the new matching feature based on similar or identical positions and poses, the redundant feature saved in the corresponding landmark information is deleted.

The updating module can add new landmark information on the basis that the number of the current matching features is greater than the preset threshold, wherein, the threshold can be fixed or set based on the number of corresponding features at the position marked in the map. For example, if the updating module finds that the number of new matching features is greater than the number of features stored in the storage device at corresponding positions based on similar or identical positions and poses, the new features are added to the created landmark information.

It should be noted that those skilled in the art should understand that the above-mentioned manner of adjusting the feature in the landmark information based on positions is only an example but not to limit the present application. In fact, the updating module can also adjust positions in the map based on features.

Figure 4:
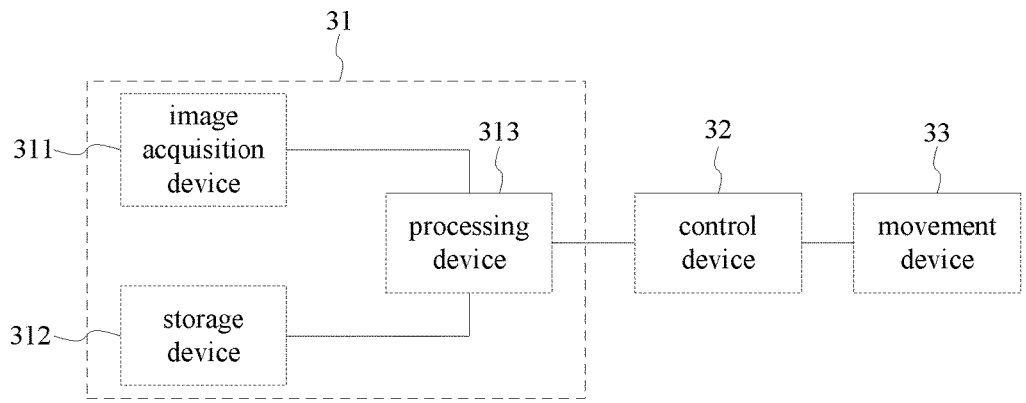
FIG. 4 shows a structural schematic diagram of a robot of the present application in one embodiment.

Refer to FIG. 4 which shows a structural schematic diagram of a mobile robot in one embodiment. The robot includes a localization system 31, a movement device 33 and a control device 32. The robot includes but is not limited to: a cleaning robot, etc.

The movement device 33 is used to drive the robot to move over a surface. By taking the cleaning robot as an example, the movement device 33 includes but is not limited to: a wheel assembly, a shock absorption assembly connected with the wheel assembly, and a drive motor used to driving the wheel.

The control device 32 can include one or more central processing units (CPU) or micro processing units (MCU) dedicated to the control of the movement device 33. For example, the control device 32 is used as a slave processing device, and the processing device 313 of the localization system 31 is used as a primary device, the control device 32 performs moving control based on the localization of the localization system 31. Alternatively, the control device 32 and the processor in the localization system 31 are shared each other, and the processor is connected with the drive motor of the movement device 33 through a bus and other modes. The control device 32 receives the data provided by the localization system 31 through a program interface. The control device 32 is used to control the movement device 33 to move based on the position and pose provided by the localization system 31.

Here, the manner in which the control device 32 controls the movement device 33 to move includes but is not limited to: determining a navigation route based on the currently determined position and pose and controlling the movement device to travel according to the determined navigation route; determining data and landmark information used to draw the map based on the positions and poses determined at the previous time and the current time, and controlling the movement device 33 to travel according to a random route or a route estimated based on determined positions and poses. Wherein, the move includes but is not limited to: a moving direction, a moving speed and the like. For example, the movement device 33 includes two drive motors, each drive motor used to drive a set of rolling wheels correspondingly, and the move includes driving the two drive motors at different speeds and rotating angles respectively, so as to make two sets of rolling wheels drive the robot to rotate in a certain direction.

In one embodiment, the localization system can perform localization processing as shown in FIG. 1 in combination with the above-mentioned corresponding description based on the FIG. 1, which will not be described in detail herein. The image acquisition device 311 shown in FIG. 4 can correspond to the image acquisition device 11 shown in FIG. 1; the storage device 312 shown in FIG. 4 can correspond to the storage device 12 shown in FIG. 1; and the processing device 313 shown in FIG. 4 can correspond to the processing device 13 shown in FIG. 1. By taking that the localization system shown in FIG. 4 includes a storage device 312, an image acquisition device 311 and a processing device 313, the processing device 31 being connected with the control device 32, and the control device 32 being connected with the movement device 33 as an example, the working process of the robot that being localized based on the position and pose of the localization system 31 and then moving is described as follows.

The corresponding relationship between the image coordinate system and the physical space coordinate system is stored in the storage device 312. During movement of the robot, the image acquisition device 311 obtains image frames in real time and temporarily stores them in the storage device 312. The processing device 313 acquires the image frame P1 at the previous time t1 and the image frame P2 at the current time t2 according to a preset time interval or image frame number interval, and obtains the positions of matching features in two image frames using a visual tracking algorithm. Based on the positions of the features obtained in each image frame and the corresponding relationship, the processing device 313 performs coordinate transformation on the positions of the features in the physical space, thereby obtaining the relative position and pose of the robot from the previous time t1 to the current time t2. The processing device 313 can obtain the relative position and pose of the robot by performing error compensation on the obtained position and pose. Meanwhile, the processing device 313 can accumulate the obtained relative positions and poses to determine the position and pose of the robot localized in the map data. The processing device 313 can provide each obtained position and pose to the control device 32. For the cleaning robot, the control device 32 can compute the control data such as moving speed, rotating direction and rotating angle required for controlling the robot to travel along the preset route based on the received positions and poses, and control the drive motor in the movement device 33 based on the control data so as to move the wheel assemblies.

Figure 5:
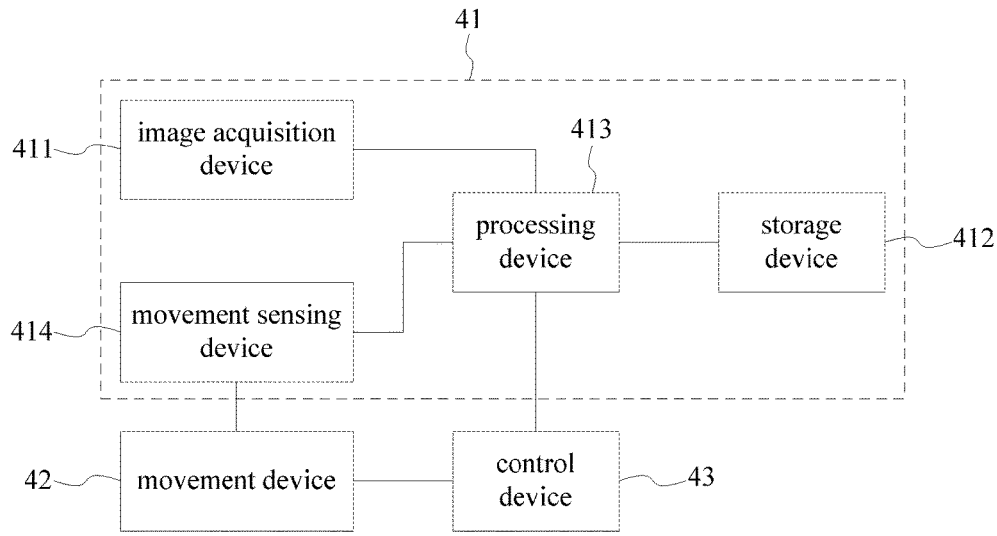
FIG. 5 shows a structural schematic diagram of a robot of the present application in another embodiment.

In other embodiments, refer to FIG. 5 which shows a structural schematic diagram of a robot in another embodiment. The localization system 41 can perform localization processing as shown in FIG. 3 in combination with the above-mentioned corresponding description based on the FIG. 3, which will not be described in detail herein. Wherein, the image acquisition device 411 shown in FIG. 5 can correspond to the image acquisition device 21 shown in FIG. 3; the storage device 412 shown in FIG. 5 can correspond to the storage device 22 shown in FIG. 3; the processing device 413 shown in FIG. 5 can correspond to the processing device 23 shown in FIG. 3; and the movement device 414 shown in FIG. 5 can correspond to the movement device 24 shown in FIG. 3.

By taking that the localization system shown in FIG. 5 includes a storage device 412, a movement sensing device 414, an image acquisition device 411 and a processing device 413, the processing device 413 being connected with the control device 43, and the control device 43 being connected with the movement device 42 as an example, the working process of the robot that being localized based on the position and pose of the localization system and then moving is described as follows.

During movement of the robot, the movement sensing device 414 acquires movement information about the robot in real time and temporarily stores them in the storage device 412. The image acquisition device 411 obtains image frames in real time and temporarily stores them in the storage device 412. The processing device 413 acquires image frame P1 at the previous time and image frame P2 at the current time according to a preset time interval or image frame number interval, and movement information between the two time. The processing device 413 can obtain the image positions of the features by tracking the features in two image frames P1 and P2. The processing device 413 creates the corresponding relationship between the image coordinate system and the physical space coordinate system according to the image positions and the physical space position provided via the movement information. Then, the processing device 413 can match the features in subsequent image frames Pi and positions thereof using the visual tracking algorithm. Based on the positions of the features obtained in each image frame and the corresponding relationship, the processing device 413 performs coordinate transformation on the positions of features in the physical space, thereby obtaining the relative position and pose of the robot during the time interval at which the two frame images are obtained. The processing device 413 can obtain the relative position and pose of the robot by performing error compensation on the obtained position and pose. Meanwhile, the processing device 413 can accumulate the obtained relative positions and poses to determine the position and pose of the robot localized in the map data. The processing device 413 can provide each obtained position and pose to the control device 43. For the cleaning robot, the control device 43 can compute the control data such as moving speed, rotating direction and rotating angle required for controlling the robot to travel along the preset route based on the received positions and poses, and control the drive motor in the movement device 42 based on the control data so as to move the wheel assemblies.

Figure 6:
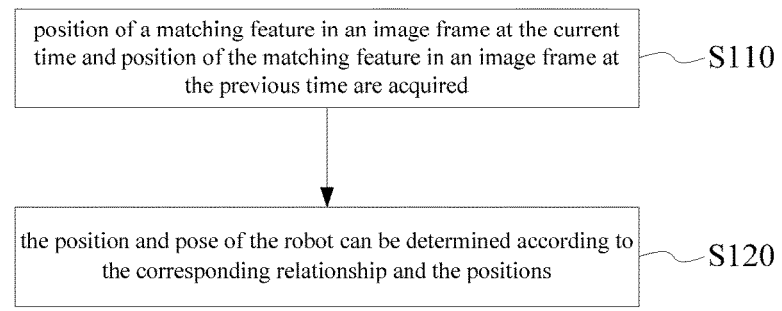
FIG. 6 shows a flowchart of a localization method of the present application in one embodiment.

Refer to FIG. 6 which shows a flowchart of a localization method for a robot of the present application in one embodiment. The localization method is mainly executed by a localization system. The localization system can be configured in a cleaning robot. The localization system can be as shown in FIG. 1 and description thereof, or can be other localization system capable of executing the localization method.

In step 110, position of a matching feature in an image frame at the current time and position of the matching feature in an image frame at the previous time are acquired.

Here, the processing device can be used to acquire an image frame at the previous time t1 and an image frame at current time t2 according to a preset time interval or image frame number interval, and identify and match the features in two image frames. Wherein, according to the design of processing capabilities of hardware and software used in the localization system, the time interval can be between several milliseconds and several hundred milliseconds, and the image frame number interval can be between 0 frame and dozens of frames. The features include but are not limited to shape features and grayscale features. The shape features include but are not limited to corner features, line features, edge features and curve features. The grayscale features include but are not limited to grayscale jump features, grayscale values greater than or less than a grayscale threshold, region dimensions of a preset grayscale range contained in the image frames.

In order to obtain accurate localization, there are multiple matching features in general, for example, more than 10 matching features. Thus, the processing device seeks matching features from the identified features based on the positions of the identified features in respective image frames. For example, as shown in FIG. 2, after the features in image frames are identified, the processing device determines that an image frame P1 contains features a1 and a2, an image frame P2 contains features b1, b2 and b3. Meanwhile, the feature a1 and the features b1 and b2 all belong to the same feature, and the feature a2 and the feature b3 belong to the same feature. The processing device determines that the feature a1 in the image frame P1 is located on the left of the feature a2 and the spacing therebetween is d1 pixel point. The processing device determines that the feature b1 in the image frame P2 is located on the left of the feature b3 and the spacing therebetween is d1' pixel point, and the feature b2 is located on the right of the feature b3 and the spacing therebetween is d2' pixel point. And then the processing device matches the position relationship between the feature b1 and the feature b3, and the position relationship between the feature b2 and the feature b3 with the position relationship between the feature a1 and the feature a2 respectively, and matches the pixel spacing between the feature b1 and the feature b3, and the pixel spacing between the feature b2 and the feature b3 with the pixel spacing between the feature a1 and the feature a2 respectively. Based on the matching results, the processing device determines that the feature a1 in the image frame P1 matches with the feature b1 in the image frame P2, and the feature a2 matches with the feature b3. By that analogy, the processing device can match all features and localize the position and pose of the robot based on the change in image pixels position corresponding to the feature. Wherein, the position of the robot can be obtained according to the displacement change in a two-dimensional plane, and the pose can be obtained according to the angle change in the two-dimensional plane.

In some embodiments, the manner of determining positions of matching features in the step 110 can be implemented by tracking positions of corresponding features contained in two image frames.

Here, the tracking module in the processing device can be used to perform above step. In some embodiments, with respect to the features in the image frame at the previous time, the tracking module can, in the image frame at the current time, track the above features using the visual tracking technology to obtain matching features. For example, by taking the position of the feature ci identified in the image frame P1 at the previous time in the image frame P1 as a reference, the tracking module determines whether the region nearby the corresponding position in the image frame P2 at the current time contains the corresponding feature ci, and acquires the position of the feature ci in the image frame P2 if the corresponding feature ci is found, or determines that the feature ci is not in the image frame P2 if the corresponding feature ci is not found. Thus, when a plurality of tracked features and the positions of all features in respective image frames are collected, step 120 can be performed.

In yet some embodiments, the tracking module can track the positions of the corresponding features contained in two image frames based on the movement information provided by the movement sensing device in the robot. For example, the hardware circuit of the tracking module is connected with the movement sensing device through data cables, and acquires movement information corresponding to the time t1 and t2 at which the two image frames P1 and P2 are acquired, estimates the candidate position of the corresponding feature ci in the image frame P2 at the current time through the position change described by the movement information by using the corresponding relationship and each feature ci identified in the image frame P1 at the previous time and the position thereof in the image frame P1, identifies the corresponding feature ci in the vicinity of the estimated candidate position, and acquires the position of the feature ci in the image frame P2 if the corresponding feature ci is found, or determines that the feature ci is not in the image frame P2 if the corresponding feature ci is not found. Thus, when the tracked features (i.e. matching features) and respective positions thereof are collected, step 120 can be performed.

In step 120, the position and pose of the robot can be determined according to the corresponding relationship and the positions. Wherein, the corresponding relationship comprises the corresponding relationship between an image coordinate system and a physical space coordinate system. The corresponding relationship can be pre-stored in the storage device before delivery.

In some embodiments, the corresponding relationship can be obtained by performing field test on the site used and then stored in the storage device. Thus, the robot further includes a movement sensing device. Before step 120 being performed, the localization method further includes: acquiring movement information about the robot, and creating the corresponding relationship based on the positions of the matching features in two image frames and the movement information acquired from the previous time to the current time.

Wherein, the movement sensing device includes but is not limited to: a displacement sensor, a gyroscope, a speed sensor, a ranging sensor and a cliff sensor. During movement of the robot, the movement sensing device continuously senses movement information and provides the movement information for the processing device. The displacement sensor, the gyroscope and the speed sensor can be integrated in one or more chips. The ranging sensor and a cliff sensor can be arranged at the side of the robot. For example, the ranging sensor in the cleaning robot is arranged at the edge of a housing; and the cliff sensor in the cleaning robot is arranged at the bottom of the robot. According to the type and number of the sensors arranged in the robot, the movement information acquired by the processing device includes but is not limited to: displacement information, angle information, information about distance between robot and an obstacle, velocity information and advancing direction information.

Here, during the movement of the robot, the processing device acquires the movement information provided by the movement sensing device and each image frame provided by the image acquisition device. To reduce the accumulative errors of the movement sensing device, the processing device can acquire the movement information and at least two image frames within a small period of time during which the robot moves. For example, the processing device acquires the movement information and at least two image frames when monitoring that the robot moves in a straight line. And for example, the processing device acquires the movement information and at least two image frames when monitoring that the robot moves angularly.

Then, the processing device identifies and matches features in all image frames, and obtains image positions of the matching features in all image frames. Wherein, the features include but are not limited to corner features, edge features, line features and curve features. For example, the processing device can acquire the image positions of the matching features using the visual tracking technology.

The processing device creates the corresponding relationship according to the image positions and the physical space position provided via the movement information. Here, the processing device can create the corresponding relationship by creating feature coordinate parameters of the physical space coordinate system and the image coordinate system. For example, the processing device can create the corresponding relationship between the physical space coordinate system and image coordinate systems by taking the physical space position where the image frame obtained at the previous time as the origin of the physical space coordinate system and corresponding the coordinate origin to the positions of the matching features of the image frames in the image coordinate system.

After the corresponding relationship is determined, the localization system performs step 120, i.e., determining the position offset information about the robot from the previous time to the current time and obtain the position and pose of the robot.

Here, in order to obtain the change in the relative position and pose of the robot quickly, the position offset information from the previous time to the current time can be obtained by performing coordinate transformation on the positions of the same feature in two image frames only by the processing device based on the corresponding relationship. The position offset information reflects the change in the relative position and pose of the robot from the previous time to the current time. The localization method can be used in localization with adequate matching features. For example, during navigation of the robot, whether the current moving route of the robot is offset can be quickly determined by acquiring change in the relative position and pose using the above-mentioned method, and subsequent navigation adjustment can be performed based on the determination result.

To prevent accumulation of errors in the image acquisition device, in one embodiment, when the step 120 being performed, the processing device determines the position and pose of the robot by combining with the movement information provided by the movement sensing device. The step 120 includes the following steps: determining the position and pose of the robot according to the corresponding relationship and the positions of the matching features, and compensating errors in the determined position and pose based on the acquired movement information.

For example, the processing device acquires two image frames from time t1 to time t2 and also acquires movement information. The processing device obtains a plurality of features for localization in two image frames and positions thereof in respective image frames according to the above-mentioned feature identifying and matching method, and determines the first position and pose of the robot based on the corresponding relationship. Based on the acquired displacement information and angle information, the processing device determines that the robot moves a distance provided by the displacement information along the deflection direction and the deflection angle indicated by the angle information, so that the second position and pose of the robot are obtained.

Affected by errors of two computing methods and hardware apparatus, there must be errors between the obtained first position and pose and second position and pose. To reduce the errors, the processing device determines the position and pose of the robot based on the errors between the first position and pose and the second position and pose. Here, the processing device can perform weight-based mean processing based on the displacement information and angle information corresponding to the first position and pose and the second position and pose respectively, thereby obtaining a position and pose of which errors are compensated. For example, the processing device takes the displacement information in the first candidate position and pose and the displacement information in the second candidate position and pose to perform weighted mean processing, thereby obtaining the displacement information in the compensated position and pose. The processing device takes the angle change information in the first candidate position and pose and the angle change information in the second candidate position and pose to perform weighted mean processing, thereby obtaining the angle change information in the compensated position and pose.

In another embodiment, the processing device can compensate the errors in the position and pose determined only based on the positions of the matching features in the image frames at the previous time and the current time by combining with the landmark information created based on the matching features. Correspondingly, the landmark information is stored in the localization system. The landmark information includes but is not limited to the following attribute information: features matched each time, map data of the features obtained each time in the physical space, the positions of the features obtained each time in corresponding image frames, positions and poses when obtaining corresponding feature and the like. The landmark information and the map data can be stored together.

The step 120 includes the following steps: determining the position and pose of the robot according to the corresponding relationship and the positions of the matching features, and compensating errors in the determined position and pose based on the stored landmark information corresponding to the matching features.

For example, the processing device obtains a plurality of features for localization in two image frames acquired at the previous time and the current time and positions thereof in respective image frames according to the above-mentioned feature identifying and matching method, and determines the first position and pose of the robot from the previous time t1 to the current time t2 based on the corresponding relationship. The processing device individually matches the matching features in two image frames with the features in the pre-stored landmark information respectively, and determines the position and pose of the robot at each obtaining time using other attribute information in the landmark information corresponding to respective matching features, thus obtaining the second position and pose of the robot from the previous time t1 to the current time t2. Then, the processing device determines the position and pose of the robot based on the errors between the first position and pose and the second position and pose. For example, the processing device takes the displacement information in the first position and pose and the displacement information in the second position and pose to perform weighted mean processing, thereby obtaining the displacement information in the compensated position and pose. The processing device takes the angle change information in the first position and pose and the angle change information in the second position and pose to perform weighted mean processing, thereby obtaining the angle change information in the compensated position and pose.

It should be noted that the processing device can perform error compensation by combining with the error compensation method containing the above-mentioned one or more error compensation modes. Alternatively, based on the above-mentioned one or more error compensation modes, the improvement and development for the error compensation mode performed by the processing device should be regarded as examples generated based on the localization technology of the present application.

In addition, the features recorded as landmark information are constant in general. However, in practical application, the features recorded as landmark information are not the case. For example, the features recorded as landmark information are contour features of a lamp, and corresponding features disappear after the lamp is replaced. If there is a need for the robot to perform localization by means of the features, features used to compensate errors will not be found. Therefore, the processing device 13 further includes a step of updating the stored landmark information based on the matching features.

Here, the processing device can acquire information including: matching features, positions of the matching features in at least one image frame, the position and pose determined by the step 120.

The processing device can determine whether to update the stored landmark information by comparing each landmark information stored in the storage device with the acquired information. For example, if the processing device finds that a feature is not stored in the storage device based on similar or identical positions and poses, the feature is correspondingly saved in the corresponding landmark information complementally. And for example, if the processing device finds that a feature is stored in the storage device but cannot match with the new matching feature based on similar or identical positions and poses, the redundant feature saved in the corresponding landmark information is deleted.

The processing device can add new landmark information on the basis that the number of the current matching features is greater than the preset threshold, wherein, the threshold can be fixed or set based on the number of corresponding features at the position marked in the map. For example, if the processing device finds that the number of new matching features is greater than the number of features stored in the storage device at corresponding positions based on similar or identical positions and poses, the new features are added to the created landmark information.

It should be noted that those skilled in the art should understand that the above-mentioned manner of adjusting the feature in the landmark information based on positions is only an example but not to limit the present application. In fact, the processing device can also adjust positions in the map based on features.

Figure 7:
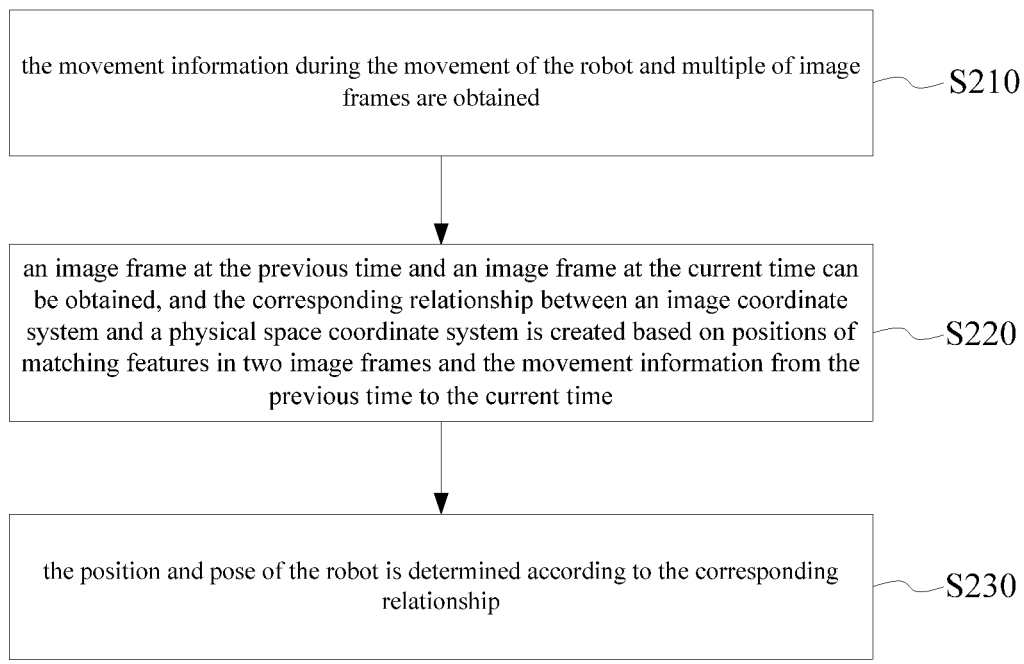
FIG. 7 shows a flowchart of a localization method of the present application in another embodiment.

Refer to FIG. 7 which shows a flowchart of a localization method of the present application in another embodiment. The localization method can be executed by a localization system shown in FIG. 3, or other localization system capable of executing the following steps. The localization method can be used in a cleaning robot.

In step 210, the movement information during the movement of the robot and multiple of image frames are obtained.

Here, during the movement of the robot, the movement sensing device and the image acquisition device of the robot acquires the movement information and image frames in real time. In this step, processing device can be used to acquire the movement information and at least two image frames within a small period of time during which the robot moves.

In step 220, an image frame at the previous time and an image frame at the current time can be obtained, and the corresponding relationship between an image coordinate system and a physical space coordinate system is created based on positions of matching features in two image frames and the movement information from the previous time to the current time.

Here, the processing device identifies and matches features in all image frames, and obtains image positions of the matching features in all image frames. Wherein, the features include but are not limited to corner features, edge features, line features and curve features. For example, the processing device can acquire the image positions of the matching features using the visual tracking technology.

Then, the processing device creates the corresponding relationship according to the image positions and the physical space position provided via the movement information. Here, the processing device can create the corresponding relationship by creating feature coordinate parameters of the physical space coordinate system and the image coordinate system. For example, the processing device can create the corresponding relationship between the physical space coordinate system and image coordinate systems by taking the physical space position where the image frame obtained at the previous time as the origin of the physical space coordinate system and corresponding the coordinate origin to the positions of the matching features of the image frames in the image coordinate system.

After the corresponding relationship is determined, the localization system performs step 230, i.e., determining the position and pose of the robot according to the corresponding relationship. Here, the processing device acquires the image frames captured by the image acquisition device, identifies the features from the image frames, determines the positions of the features in the image frames in the physical space based on the corresponding relationship, and determines the position and pose of the robot by means of accumulation of multiple image frames.

In one embodiment, the step 230 includes: acquiring the matching features in the image frame at the current time and the matching features in the image frame at the previous time, and determining the position and pose of the robot according to the corresponding relationship and the features.

Here, the processing device can acquire an image frame at the previous time t1 and an image frame at current time t2 according to a preset time interval or image frame number interval, and identify and match the features in two image frames. Wherein, according to the design of processing capabilities of hardware and software used in the localization system, the time interval can be between several milliseconds and several hundred milliseconds, and the image frame number interval can be between 0 frame and dozens of frames. The features include but are not limited to shape features and grayscale features. The shape features include but are not limited to corner features, line features, edge features and curve features. The grayscale features include but are not limited to grayscale jump features, grayscale values greater than or less than a grayscale threshold, region dimensions of a preset grayscale range contained in the image frames.

In order to obtain accurate localization, there are multiple matching features in general, for example, more than 10 matching features. Thus, the processing device seeks matching features from the identified features based on the positions of the identified features in respective image frames. For example, as shown in FIG. 2, after identifying the features in all image frames, the processing device determines that an image frame P1 contains features a1 and a2, an image frame P2 contains features b1, b2 and b3. Meanwhile, the feature a1 and the features b1 and b2 all belong to the same feature, and the feature a2 and the feature b3 belong to the same feature. The processing device determines that the feature a1 in the image frame P1 is located on the left of the feature a2 and the spacing therebetween is d1 pixel point. The processing device determines that the feature b1 in the image frame P2 is located on the left of the feature b3 and the spacing therebetween is d1' pixel point, and the feature b2 is located on the right of the feature b3 and the spacing therebetween is d2' pixel point. And then the processing device matches the position relationship between the feature b1 and the feature b3, and the position relationship between the feature b2 and the feature b3 with the position relationship between the feature a1 and the feature a2 respectively, and matches the pixel spacing between the feature b1 and the feature b3, and the pixel spacing between the feature b2 and the feature b3 with the pixel spacing between the feature a1 and the feature a2 respectively. Based on the matching results, the processing device determines that the feature a1 in the image frame P1 matches with the feature b1 in the image frame P2, and the feature a2 matches with the feature b3. By that analogy, the processing device can match all features and localize the position and pose of the robot based on the change in image pixels position corresponding to the feature. Wherein, the position of the robot can be obtained according to the displacement change in a two-dimensional plane, and the pose can be obtained according to the angle change in the two-dimensional plane.

Here, the processing device can determine the image position offset information about a plurality of features in two image frames or determine the physical position offset information about the plurality of features in the physical space according to the corresponding relationship, and compute the relative position and pose of the robot from the time t1 to the time t2 by synthesizing any one of the obtained position offset information. For example, through coordinate transformation, the processing device determines that the position and pose of the robot from the time t1 at which the image frame P1 is obtained to the time t2 at which the image frame P2 is obtained is: moving m length over a surface and rotating n degree to the left. By taking a cleaning robot as an example, when the cleaning robot already creates a map, it can help the robot determine whether it is on a planned route according to the position and pose obtained by the processing device. When the cleaning robot does not create a map, it can help the robot determine the relative displacement and the relative rotating angle according to the position and pose obtained by the processing device, and draw the map by means of the data.

In some embodiments, the step 230 includes the following steps: determining the position and pose of the robot according to the corresponding relationship and the positions of the matching features; and compensating errors in the determined position and pose based on the acquired movement information.

For example, the processing device acquires two image frames from time t1 to time t2 and also acquires movement information. The processing device obtains a plurality of features for localization in two image frames and positions thereof in respective image frames according to the above-mentioned feature identifying and matching method, and determines the first position and pose of the robot based on the corresponding relationship. Based on the acquired displacement information and angle information, the processing device determines that the robot moves a distance provided by the displacement information along the deflection direction and the deflection angle indicated by the angle information, so that the second position and pose of the robot are obtained.

Affected by errors of two computing methods and hardware apparatus, there must be errors between the obtained first position and pose and second position and pose. To reduce the errors, the processing device determines the position and pose of the robot based on the errors between the first position and pose and the second position and pose. Here, the processing device can perform weight-based mean processing based on the displacement information and angle information corresponding to the first position and pose and the second position and pose respectively, thereby obtaining a position and pose of which errors are compensated. For example, the processing device takes the displacement information in the first candidate position and pose and the displacement information in the second candidate position and pose to perform weighted mean processing, thereby obtaining the displacement information in the compensated position and pose. The processing device takes the angle change information in the first candidate position and pose and the angle change information in the second candidate position and pose to perform weighted mean processing, thereby obtaining the angle change information in the compensated position and pose.

In another embodiment, the processing device can compensate the errors in the position and pose determined only based on the positions of the matching features in the image frames at the previous time and the current time by combining with the landmark information created based on the matching features. Correspondingly, the landmark information is stored in the storage device. The landmark information includes but is not limited to the following attribute information: features matched each time, map data of the features obtained each time in the physical space, the positions of the features obtained each time in corresponding image frames, positions and poses when obtaining corresponding feature and the like. The landmark information and the map data can be stored in the storage device together.

The step 230 includes the following steps: determining the position and pose of the robot according to the corresponding relationship and the positions of the matching features, and compensating errors in the determined position and pose based on the stored landmark information corresponding to the matching features.

For example, the processing device obtains a plurality of features for localization in two image frames acquired at the previous time and the current time and positions thereof in respective image frames according to the above-mentioned feature identifying and matching method, and determines the first position and pose of the robot from the previous time t1 to the current time t2 based on the corresponding relationship. The processing device individually matches the matching features in two image frames with the features in the pre-stored landmark information respectively, and determines the position and pose of the robot at each obtaining time using other attribute information in the landmark information corresponding to respective matching features, thus obtaining the second position and pose of the robot from the previous time t1 to the current time t2. Then, the processing device determines the position and pose of the robot based on the errors between the first position and pose and the second position and pose. For example, the processing device takes the displacement information in the first position and pose and the displacement information in the second position and pose to perform weighted mean processing, thereby obtaining the displacement information in the compensated position and pose. The processing device takes the angle change information in the first position and pose and the angle change information in the second position and pose to perform weighted mean processing, thereby obtaining the angle change information in the compensated position and pose.

It should be noted that the processing device can perform error compensation by combining with the error compensation method containing the above-mentioned one or more error compensation modes. Alternatively, based on the above-mentioned one or more error compensation modes, the improvement and development for the error compensation mode performed by the processing device should be regarded as examples generated based on the localization technology of the present application.

In addition, the features recorded as landmark information are constant in general. However, in practical application, the features recorded as landmark information are not the case. For example, the features recorded as landmark information are contour features of a lamp, and corresponding features disappear after the lamp is replaced. If there is a need for the robot to perform localization by means of the features, features used to compensate errors will not be found. Therefore, the processing device 13 further includes a step of updating the stored landmark information based on the matching features.

Here, the processing device can acquire information including: matching features, positions of the matching features in at least one image frame, the position and pose determined by the step 230.

The processing device can determine whether to update the stored landmark information by comparing each landmark information stored in the storage device with the acquired information. For example, if the processing device finds that a feature is not stored in the storage device based on similar or identical positions and poses, the feature is correspondingly saved in the corresponding landmark information complementally. And for example, if the processing device finds that a feature is stored in the storage device but cannot match with the new matching feature based on similar or identical positions and poses, the redundant feature saved in the corresponding landmark information is deleted.

The processing device can add new landmark information on the basis that the number of the current matching features is greater than the preset threshold, wherein, the threshold can be fixed or set based on the number of corresponding features at the position marked in the map. For example, if the processing device finds that the number of new matching features is greater than the number of features stored in the storage device at corresponding positions based on similar or identical positions and poses, the new features are added to the created landmark information.

It should be noted that those skilled in the art should understand that the above-mentioned manner of adjusting the feature in the landmark information based on positions is only an example but not to limit the present application. In fact, the processing device can also adjust positions in the map based on features.

Above all, in the present application, the localization error of the robot can be effectively reduced by determining the position and pose of the robot by means of the position offset information about the matching feature points in two image frames captured by the image acquisition device. In addition, the corresponding relationship between an image coordinate system and a physical space coordinate system can be initialized based on the position offset information about the matching feature points in two image frames and the movement information provided by the sensor, thereby the localization performed by a monocular camera is implemented and the problem about accumulative errors of the sensor is solved effectively.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A localization system for a robot, comprising:
a storage device, configured to store a corresponding relationship between an image coordinate system and a physical space coordinate system;
an image acquisition device, configured to capture image frames during movement of the robot;
a processing device, connected with the image acquisition device and the storage device, and configured to:
acquire, by a first method, a position of a landmark from one or more features of a landmark database within a captured image frame;
acquire, by a second method, a position of the one or more matching features in an image frame at the current time and a position of the one or more matching features in an image frame at a previous time; and
determine, by the second method, a location of the robot according to the corresponding relationship and the positions of the matching features, wherein, the location of the robot includes a position and a pose of the robot; and
a movement sensing device, connected with the processing device and configured to acquire movement information about the robot;
wherein, the determined location of the robot by the second method is obtained by tracking positions of corresponding features contained in two successive-in-time image frames based on the movement information provided by the movement sensing device in the robot, wherein, the corresponding features are a pair of matching features, without accessing the landmark database during tracking by the second method.

2. The localization system for a robot of claim 1, wherein, an angle between an optic axis of field of view of the image acquisition device and a vertical line is ±30°, or an angle between the optic axis of field of view of the image acquisition device and a horizontal line is 60-120°, wherein, the horizontal line is parallel to a surface over which the robot moves, and the vertical line is perpendicular to the horizontal line.

3. The localization system for a robot of claim 1, wherein, the processing device is configured to execute a program module stored in the storage device comprising an initialization module configured to create the corresponding relationship based on positions of the matching features in two image frames and the movement information acquired from the previous time to the current time.

4. The localization system for a robot of claim 1, wherein, the processing device is configured to execute program modules stored in the storage device comprising:
a first localization module, configured to determine the position and the pose of the robot according to the corresponding relationship and positions of the matching features; and
a first localization compensation module, configured to compensate errors in the determined position and pose based on the acquired movement information.

5. The localization system for a robot of claim 1, wherein, the storage device is configured to further store landmark information created based on the matching features.

6. The localization system for a robot of claim 5, wherein, the processing device is configured to execute program modules stored in the storage device comprising:
a second localization module, configured to determine the position and the pose of the robot according to the corresponding relationship and positions of the matching features; and
a second localization compensation module, configured to compensate errors in the determined position and pose based on the stored landmark information corresponding to the matching features.

7. The localization system for a robot of claim 5, wherein, the processing device is configured to execute a program module stored in the storage device comprising an updating module configured to update the stored landmark information based on the matching features.

8. A robot, comprising:
a storage device, configured to store a corresponding relationship between an image coordinate system and a physical space coordinate system;
an image acquisition device, configured to capture image frames during movement of the robot;
a processing device, connected with the image acquisition device and the storage device, and configured to:
acquire, by a first method, a position of a landmark from one or more features of a landmark database within a captured image frame;
acquire, by a second method, a position of the one or more matching features in an image frame at the current time and a position of the one or more matching features in an image frame at a previous time; and
determine a location of the robot according to the corresponding relationship and the positions, wherein, the location of the robot includes a position and a pose of the robot;
a movement device, configured to move the robot over a surface;
a control device, connected with the processing device and the movement device, and configured to control the movement device to move based on the position and the pose provided by the processing device; and
a movement sensing device, connected with the control device and configured to acquire movement information about the robot;
wherein, the determined location of the robot by the second method is obtained by tracking positions of corresponding features contained in two successive-in-time image frames based on the movement information provided by the movement sensing device in the robot, wherein, the corresponding features are a pair of matching features, without accessing the landmark database during tracking by the second method.

9. The robot of claim 8, wherein, an angle between an optic axis of field of view of the image acquisition device and a vertical line is ±30°, or an angle between the optic axis of field of view of the image acquisition device and a horizontal line is 60-120°, wherein, the horizontal line is parallel to a surface over which the robot moves, and the vertical line is perpendicular to the horizontal line.

10. The robot of claim 8, wherein, the processing device is configured to execute a program module stored in the storage device comprising an initialization module configured to create the corresponding relationship based on positions of the matching features in two image frames and the movement information acquired from the previous time to the current time.

11. The robot of claim 8, wherein, the processing device is configured to execute program modules stored in the storage device comprising:

a first localization module, configured to determine the position and the pose of the robot according to the corresponding relationship and positions of the matching features; and a first localization compensation module, configured to compensate errors in the determined position and pose based on the acquired movement information.

12. The robot of claim 8, wherein, the storage device is configured to further store landmark information created based on the matching features.

13. The robot of claim 12, wherein, the processing device is configured to execute program modules stored in the storage device comprising:

a second localization module, configured to determine the position and the pose of the robot according to the corresponding relationship and positions of the matching features; and a second localization compensation module, configured to compensate errors in the determined position and pose based on the stored landmark information corresponding to the matching features.

14. A localization method for a robot, comprising:

acquiring, by a first method, a position of a landmark from one or more features of a landmark database within a captured image frame;

acquiring, by a second method, a position of the one or more matching features in an image frame at the current time and a position of the one or more matching features in an image frame at a previous time; and determining, by the second method, a location of the robot according to a corresponding relationship and the positions of the matching features, wherein, the location of the robot includes a position and a pose of the robot, and the corresponding relationship comprises a corresponding relationship between an image coordinate system and a physical space coordinate system;

wherein, the determined location of the robot by the second method is obtained by tracking positions of corresponding features contained in two successive-in-time image frames based on the movement information provided by the movement sensing device in the robot, wherein, the corresponding features are a pair of matching features, without accessing the landmark database during tracking by the second method.

15. The localization method for a robot of claim 14, further comprising a step of acquiring movement information about the robot.

16. The localization method for a robot of claim 15, further comprising a step of creating the corresponding relationship based on positions of the matching features in two image frames and the movement information acquired from the previous time to the current time.

* * * * *